United States Patent [19]

Grossnickle

[11] Patent Number: 4,839,776
[45] Date of Patent: Jun. 13, 1989

[54] ILLUMINATION MEANS FOR VEHICLE SIDE WALLS

[76] Inventor: Paul G. Grossnickle, 3413 Garfield Ave., Highland, Ind. 46322

[21] Appl. No.: 81,111

[22] Filed: Aug. 3, 1987

[51] Int. Cl.⁴ .............................................. F21V 8/00
[52] U.S. Cl. ...................................... 362/31; 362/80; 362/234; 40/546
[58] Field of Search ................... 362/61, 80, 31, 812, 362/249, 253, 237, 234, 227; 40/546, 152.2, 541

[56] References Cited

U.S. PATENT DOCUMENTS

| | | | |
|---|---|---|---|
| 1,190,600 | 7/1916 | Shreves et al. | 40/152.2 |
| 2,030,750 | 4/1980 | Lo | 40/546 |
| 2,086,524 | 7/1937 | Clark | 362/80 |
| 2,577,982 | 12/1951 | Traum | 40/152.2 |
| 2,634,530 | 4/1953 | Herschede et al. | 40/152.2 |
| 3,187,172 | 6/1965 | Knapp et al. | 362/80 |
| 3,191,019 | 6/1965 | Kijnders et al. | 362/225 |
| 3,464,133 | 9/1969 | Poray | 40/152.2 |
| 3,892,959 | 7/1975 | Pulles | 362/249 |

FOREIGN PATENT DOCUMENTS 2030751  4/1980  United Kingdom .................. 362/31

Primary Examiner—Ira S. Lazarus
Assistant Examiner—D. M. Cox
Attorney, Agent, or Firm—Todd A. Dawson

[57] ABSTRACT

A device for illuminating the side wall of a trailer or other vehicle for use in advertising. A transparent plate is attached to the side wall and covers an opaque coating containing advertising or the like. A light source or plurality of light sources are housed adjacent the vehicle and directed to an edge of the transparent plate which illuminates by internal reflection the opaque coating thus producing a lighted advertising.

1 Claim, 2 Drawing Sheets

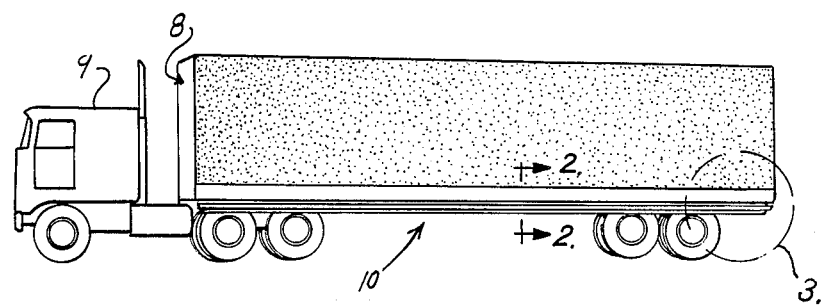
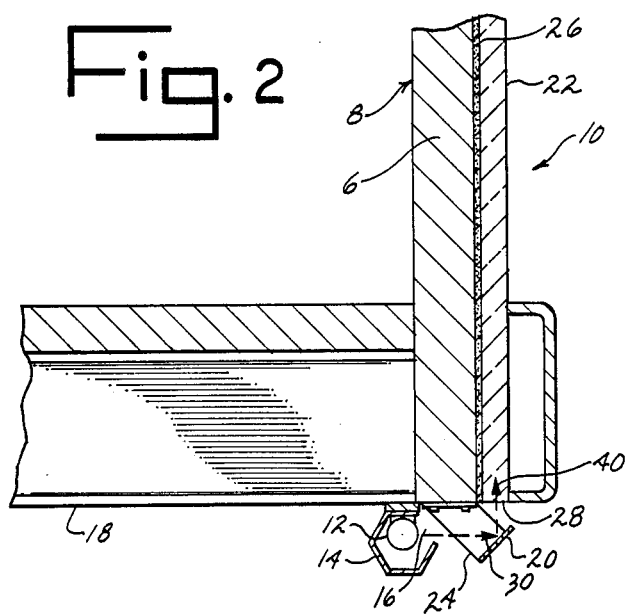
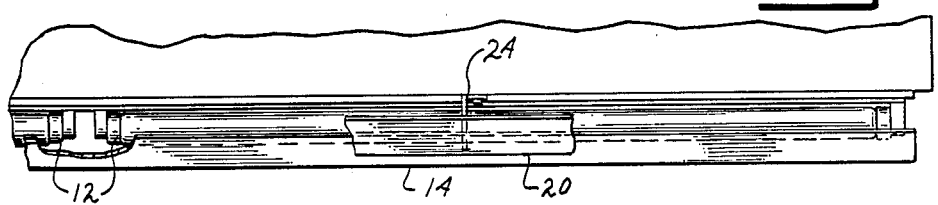

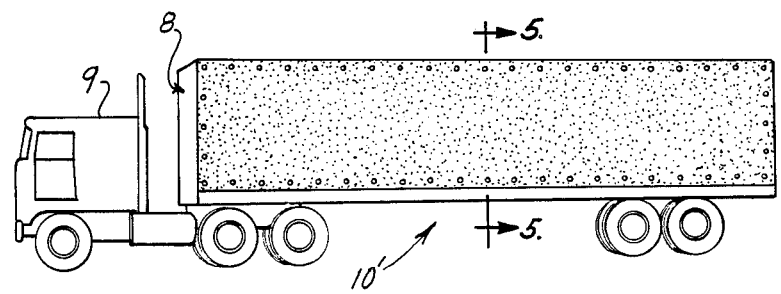
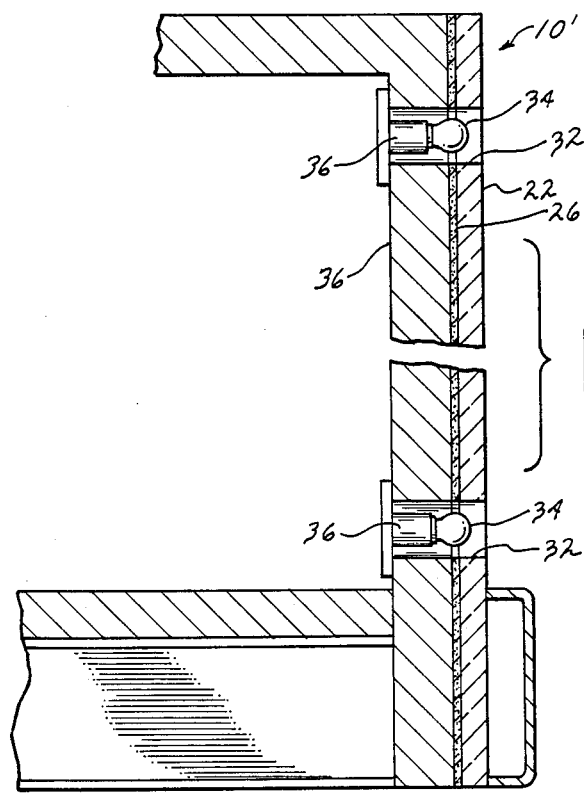

ILLUMINATION MEANS FOR VEHICLE SIDE WALLS

BACKGROUND OF THE INVENTION

This invention will relate to illuminating large planar areas and will have specific application to the illumination of semitrailer or van side walls for use in advertising.

Heretofore, semitrailer or van side walls have been painted or decorated with advertisements to create a traveling billboard. This allows advertisers or manufacturers to place their name or product name in front of the public while a semitrailer travels on the public roads. Such painted trailers have become commonplace upon the roads.

A problem arises, however, when because of darkness the advertisement cannot adequately be seen. The inability to see and read the manufacturer's advertisement when the trailer is traveling at night yields a lower cost/benefit ratio for the manufacturer's advertising dollar. This invention alleviates the above problem by illuminating the side walls so that the advertisement may be viewed at night.

SUMMARY OF THE INVENTION

In this invention, vehicle side walls are illuminated by either a single longitudinal strip of multiple light sources housed underneath a trailer and reflected up through a rigid transparent plate or by multiple light sources positioned about the perimeter of the transparent plate. The transparent plate is attached to and preferably covers the entire dimensions of a vehicle side wall to thereby illuminate the entire surface for use in advertising.

Accordingly, it is an object of this invention to provide a means for illuminating large planar areas with a single row of light sources.

Another object of this invention is to provide an illuminatino means for semitrailer or other vehicle side walls.

Other objects of this invention will become obvious upon a reading of the following description.

BRIEF DESCRIPTION OF THE DRAWINGS

FIG. 1 is a perspective view of the invention attached to a semitrailer.

FIG. 2 is a sectional view taken along line 2—2 of FIG. 1.

FIG. 3 is a fragmented enlarged view within segmented circle 3 of FIG. 1.

FIG. 4 is a perspective view of a second embodiment of this invention attached to a semitrailer.

FIG. 5 is a sectional view taken along line 5—5 of FIG. 4.

DESCRIPTION OF THE PREFERRED EMBODIMENTS

The preferred embodiments herein described are not intended to be exhaustive or to limit the application to the precise forms disclosed. They are chosen and described to explain the principles of the invention and its application and practical use to enable others skilled in the art to utilize its teachings.

FIG. 1 illustrates illumination device in a first embodiment 10 in use with a semitrailer 8 pulled by a tractor 9. Trailer 8 includes a side wall 6 which is covered by an opaque coating 26. Coating 26 includes the advertising material or design and may be a paint, plastic decal, or solid block lettering. A translucent plate 22 of polycarbonate or a similar material adjacently overlies coating 26 and is fastened to the side wall 6 through appropriate means.

FIGS. 2 and 3 illustrate the illumination device 10 connected to trailer side wall 6. Device 10 includes a replaceable light emitting source 12 which may be a single fluorescent or incandescent light bulb or a plurality of end to end light tubes as shown. Light source 12 is connected to a power source such as the vehicle battery (not shown) and is covered by a shield 14. Shield 14 is formed of a suitable rigid material with an opening 16 and may include an inner reflective surface. Shield 14 is mounted to trailer frame 18 with opening 16 oriented as seen in FIG. 3. Reflector strip 20 is connected to the bottom of frame 18 by brackets 24 (only one shown) at an oblique angle relative to the light rays emitted from light source 12 so as to reflect the light rays through a bottom edge 28 of plate 22 into the plate.

When device 10 is in use, light source 12 is illuminated and emits light through opening 16 of shield 14 in the direction of arrow 30. Reflector 20 is positioned so as to reflect light rays emitted from light source 12 in the direction of arrow 40 through plate 22, which by total internal reflection, illuminates opaque coating 26 thereby producing an illuminated advertisement.

It should be noted that the length of light source 12, shield 14, and reflector strip 20 will vary to accommodate various sized walls to be illuminated.

The illumination device is depicted in a second embodiment 10' in FIGS. 4 and 5. Components of device 10' having a common function with like components of device 10 in FIGS. 1–3 are numbered the same in FIGS. 4–5.

In FIGS. 4 and 5 device 10' is shown in use with trailer side wall 6. Side wall 6 is covered by an opaque covering 26 and a translucent plate 22 adjacently overlies coating 26. A plurality of bores 32 extend through side wall 6, coating 26 and plate 22 about the periphery of the wall. A corresponding number of light sources 34 with sockets 36 are positioned within bores 32. Sockets 36 are attached by conventional means to the trailer side wall and connected to the vehicle battery source (not shown). Light sources 36 are located in the general plane of plate 22.

In use, light sources 34 emit light rays directly into the edges of bores 32 at plate 22 which by total internal reflection illuminates opaque covering 26.

It is to be understood that the above description does not limit the invention to the precise form disclosed, but may be modified within the scope of the following claims.

I claim:

1. In combination, a vehicle having a sidewall and illumination means for lighting said sidewall, the combination wherein said sidewall includes an opaque covering, a translucent plate adjacently overlying said opaque covering and including an edge, said translucent plate having a plurality of bores formed therein, said illumination means including light source means for directing light rays into said plate from its edge, said light source means being a plurality of lights, said lights positioned within said bores and within the plane of said translucent plate, said lights constituting means for illuminating said transparent plate and opaque covering.

* * * * *